United States Patent [19]

Singh

[11] 3,912,704
[45] Oct. 14, 1975

[54] PROTEASE INHIBITOR FROM HORSE URINE

[75] Inventor: Kartar Singh, Beaconsfield, Canada

[73] Assignee: Ayerst, McKenna and Harrison Ltd., Montreal, Canada

[22] Filed: May 13, 1974

[21] Appl. No.: 469,180

Related U.S. Application Data

[63] Continuation-in-part of Ser. No. 251,168, May 8, 1972, abandoned.

[52] U.S. Cl.............. 260/112 R; 195/65; 195/66 B; 424/99
[51] Int. Cl.² .......................................... C07G 7/00
[58] Field of Search............ 260/112 R; 424/99, 100

[56] References Cited
UNITED STATES PATENTS

| | | | |
|---|---|---|---|
| 2,190,248 | 2/1940 | Wolheim............................ | 424/99 X |
| 2,292,841 | 8/1942 | Necheles............................. | 424/99 |
| 2,364,760 | 12/1944 | Sandweiss............................ | 424/99 |
| 2,429,398 | 10/1947 | Cook et al. ........................ | 424/99 X |

OTHER PUBLICATIONS

The Proteins, Vol. III, 1965, pp. 20–23, Neurath.
J. of Biol. Chem., Vol. 213, pp. 655–671, 1955, Shulman.
Dissertation Abstracts, p. 1792–B, 1966, Zendzian.
Chem. Abstracts, Vol. 69, 1968, 84035a, Kelemen et al.

*Primary Examiner*—Howard E. Schain

[57] ABSTRACT

A protease inhibitor isolated from horse urine particularly active against trypsin, chymotrypsin and plasmin which differs from a similar inhibitor isolated from human urine in having a different isoelectric point, different staining properties, and about twice the trypsin-inhibiting activity of the latter, and a process for isolating the said protease inhibitor from horse urine.

1 Claim, No Drawings

PROTEASE INHIBITOR FROM HORSE URINE

This application is a continuation-in-part of copending application Ser. No. 251,168, filed May 8, 1972, now abandoned.

BACKGROUND OF THE INVENTION

This invention relates to a protease inhibitor isolated from horse urine which inhibits proteolytic enzymes such as, for example, trypsin, chymotrypsin, or plasmin, and the urokinase catalyzed activation of plasminogen, and which differs from other known protease inhibitors isolated from human urine in its isoelectric point, its staining properties, and its particularly high degree of activity in inhibiting trypsin. The invention also relates to a process for isolating the said protease inhibitor from horse urine, and for purifying the same.

Protease inhibitors have previously been isolated from human urine. For example, Astrup et al., Scandinav. J. Clin. and Lab. Investigation Vol. 11, p. 181 (1959) have isolated a trypsin inhibitor from human urine which has almost no effect on plasmin or plasminogen even in concentrations where trypsin was completely inactivated. The protease inhibitor of this invention differs from the trypsin inhibitor isolated by Astrup et al. cited above in its isoelectric point, in its staining properties, and in its degree of activity in inhibiting trypsin. It also differs from the inhibitor isolated by Schulman from human urine (N. Raphael Schulman, J. Biol. Chem. Vol. 213, 1955 page 655). It is useful in the therapy of proteolytic hyperfunction, in particular in the treatment of conditions in which the body tissues themselves are attacked by their own proteolytic enzymes. Examples of such useful applications of the protease inhibitor of this invention include the treatment of acute pancreatitis or of intestinal ulcers. The antifibrinolytic activity of the protease inhibitor of this invention is useful in a variety of conditions in which excessive fibrinolytic activity is undesirable, e.g. in the treatment of burns, in local hemorrhage, in the prevention of formation of scar tissue, and in the prevention of the formation of postoperative adhesions. The protease inhibitor of this invention is also useful in the treatment of anaphylactic or traumatic shock.

When the protease inhibitor of this invention is used for the treatment of diseases associated with proteolytic hyperfunction it is most advantageously employed in solution in a pharmacologically acceptable vehicle, for example physiological saline, glucose solution, or sodium lactate solution, the latter preferably in one-sixth M concentration. Such preparations may contain from 500-10,000 international milliunits (ImU) per milliliter and are administered parenterally, preferably by intravenous infusion. In the treatment of acute pancreatitis, of intestinal ulcers, of anaphylactic or traumatic shock, or for the prevention of local hemorrhage, especially in major surgery, it is preferred to start treatment with a massive i.v. dose of 100,000 – 1,000,000 ImU, preferably 150,000 – 500,000 ImU, per patient during the first 24 hours followed either by treatment with 50,000-75,000 ImU over the next 3-4 hours or by treatment with 50,000-200,000 ImU per patient per day for the next 3-4 days. The protease inhibitor of this invention may also be used topically, for example in the irrigation of the bladder following transurethral prostatectomy, in the irrigation of wounds, especially of burns, and in wound dressings. For such purposes the protease inhibitor of this invention is preferably used in concentrations of 100-400 ImU/ml in solution in one of the vehicles listed above, and such solutions are applied topically for periods of time of from one to several days.

SUMMARY OF THE INVENTION

A convenient process for preparing the protease inhibitor of this invention comprises the treatment of horse urine with a selective absorbent for the inhibitor, such as various kinds of clays, magnesium oxide, diatomaceous earth ("Celite"), kaolin, alumina, calcium phosphate, cellulose ion exchangers, or other ion exchange resins. The preferred absorbent is bentonite, an aluminum silicate clay. The protease inhibitor of this invention may be eluted from the respective absorbent with a selective solvent such as, for example, aqueous pyridine, aqueous dimethyl sulfoxide, dilute ammonia, or buffers of approximately pH 7–10. A solution containing the protease inhibitor of this invention in crude form is thus obtained.

Alternatively, the protease inhibitor of this invention may also be obtained in the crude form as a solid by treating horse urine with a suitable protein precipitant, for example acetone, ethanol, or ammonium sulfate.

The crude preparations thus obtained are conveniently purified by treatment with ion exchange resins, cellulose ion exchangers, calcium phosphate, or gel filtration. The preferred agents for this purpose are certain cellulose ion exchangers such as carboxymethyl cellulose, diethylaminoethyl (DEAE) - cellulose, or cross-linked dextran gels, such as G-10, G-15, G-25, G-50, G-75, G-100, or G-200 Sephadex gels (Pharmacia (Canada) Ltd., Montreal). Further purification may be carried out by gel filtration on cross-linked dextran gels or polyacrylamide gels or by chromatography on calcium phosphate gels.

The purified protease inhibitor of this invention is electrophoretically homogeneous, and on gel filtration gives a single sharp peak of material absorbing at 280 nm. Its molecular weight as determined by gel filtration on "Sephadex" G-75 is 26000–28000; as determined by polyacrylamide gel electrophoresis in the presence of the anionic detergent sodium dodecyl sulfate (Weber et al., J. Biol. Chem. 244, 4406 (1969)) is approximately 17,000; and as determined by ultracentrifugation about 20,400. It is stable to heating at 90°–100°C, at pH 2.0–5.0, but at higher pH values activity is gradually lost by heating to 98°C. The purified protease inhibitor of this invention has a u.v. absorbtion spectrum which is typical for proteins with a maximum at about 280 m$\mu$, and is particularly characterized by its isoelectric point of 4.5-4.6. In this respect it differs significantly from the trypsin inhibitor isolated from human urine by Astrup et al., cited above, which has an isoelectric point of 2.1, or the preparation of Schulman for which an isoelectric point of 2.8 has been reported. Furthermore, the protease inhibitor of this invention may be easily stained with Ponceau S, whereas the trypsin inhibitor described by Astrup et al. cited above does not stain well with Ponceau S, a dye commonly used as a protein stain. A further significant difference between the protease inhibitor of this invention and the trypsin inhibitor isolated from human urine by Astrup et al. cited above is the degree of inhibition of trypsin: 1 milligram of the purest preparation of the protease inhibitor of this invention inhibits about 3-4 mg. of trypsin, whereas 1 mg. of the trypsin inhibitor described by Astrup et al. is reported to inhibit approximately 0.83 mg. of trypsin. One milligram of the trypsin inhibitor described by Schulman inhibits 0.45 mg. of trypsin. The preparations of the protease inhibitor of this invention are assayed by the method described by Fritz et al., Z. Physiol Chem. 345, 150 (1966) and Annals of the New York Acadamy of Sciences 146, Art. 2, 400 (1968).

In addition to being a powerful inhibitor of trypsin, the protease inhibitor of this invention also inhibits chymotrypsin although to a somewhat lesser degree, and has weak inhibitory action upon fibrinolysin and upon the activation of plasminogen by urokinase or streptokinase. The approximate amino acid composition of the protease inhibitor of this invention, determined by hydrolysis with 6 N hydrochloric acid at 110°C under reduced pressure for 24, 48, and 72 hours is shown in the following table.

TABLE 1

| Duration of Hydrolysis | Amino Acids, grams per 100 g. Protease Inhibitor | | |
|---|---|---|---|
| | 24 Hours | 48 Hours | 72 Hours |
| Lysine | 7.4 | 7.2 | 7.1 |
| Histidine | 1.0 | 1.0 | 0.9 |
| Arginine | 6.5 | 6.5 | 6.2 |
| Cysteic Acid | — | — | — |
| Aspartic Acid | 11.7 | 12.0 | 12.0 |
| Methionine Sulfone | — | — | — |
| Threonine | 4.2 | 4.3 | 4.4 |
| Serine | 4.2 | 4.3 | 4.4 |
| Glutamic Acid | 17.0 | 17.3 | 17.5 |
| Proline | 3.3 | 3.3 | 3.4 |
| Glycine | 7.8 | 8.0 | 8.0 |
| Alanine | 5.4 | 5.6 | 5.7 |
| ½ Cystine | — | — | — |
| Valine | 2.5 | 2.5 | 2.6 |
| Methionine | 1.6 | — | — |
| Isoleucine | 4.0 | 4.1 | 4.2 |
| Leucine | 7.5 | 7.6 | 7.8 |
| Tyrosine | 7.8 | 7.9 | 7.1 |
| Phenylalanine | 8.1 | 8.4 | 8.6 |
| Total gms. | 100 | 100 | 100 |

DETAILED DESCRIPTION OF THE INVENTION

In the preparation of the protease inhibitor of this invention it is preferred to use horse urine previously clarified by centrifugation as the starting material. Such clarified horse urine (100 parts by volume) is adjusted to pH 4.5–6.0 by addition of an acid, preferably acetic or hydrochloric acid, a suitable aluminum silicate clay, preferably bentonite, is added in amounts of from 0.05 to 5.0 parts by weight, preferably about 0.1 to 1.0 parts by weight, the mixture is stirred at 0° to 37°C. preferably 20°–24°C. for 15 minutes to 16 hr., preferably for about 30–120 minutes, and centrifuged. The protease inhibitor of this invention is absorbed on the bentonite and is eluted by washing the latter with 2–20 parts, preferably 4–10 parts by volume of an aqueous solution of pyridine containing 0.5–8 percent, preferably 1–4 percent (vol/vol) of pyridine.

The aqueous pyridine eluate obtained above is adjusted to pH 1.0 to 3.0, preferably to pH 1.2 to 1.6, by addition of mineral acid, preferably $H_2SO_4$ or HCl. To 100 parts of the acidified solution 1 to 10 parts, preferably 2–5 parts, by weight of bentonite is added, the mixture is stirred for 15–120 minutes, preferably for 30–60 minutes, at room temperature and centrifuged. The bentonite residue containing the adsorbed inhibitor is shaken with 2–10 parts, preferably 4–6 parts by volume of an aqueous pyridine solution containing 0.5–10 percent, preferably 2–5% (vol/vol) of pyridine for 15 to 120 minutes, preferably 30 to 60 minutes. The mixture is centrifuged and the clear supernatant containing the inhibitor is dialyzed against running tap water in order to remove pyridine and other dialyzable impurities. The inhibitor is precipitated by the addition of 1.5 to 5.0 volumes, preferably 2–3 volumes, of acetone at 5° to −20°C, preferably at −5° to −15°C, to 1 volume of the dialyzed solution, cooled to 0° to 5°. The precipitate formed is collected by centrifugation or filtration, washed with acetone and ether and dried under reduced pressure. A crude concentrate in the form of a dark brown material containing the protease inhibitor of this invention is obtained.

Alternatively, the clarified horse urine is dialyzed against tap water for 1 to 3 days. The dialyzed urine or the concentrate obtained thereof by evaporation under reduced pressure is treated with 1.5–5.0 volumes of ethanol or acetone, preferably 2–3 volumes of acetone, at 5°C to −°°C, preferably −5° to −15°C. The precipitate recovered by centrifugation or filtration contains the protease inhibitor of this invention.

As another alternative the inhibitor is precipitated by addition of 30–75 parts, preferably 50–60 parts, by weight of ammonium sulphate to 100 parts of dialyzed urine or the concentrate obtained thereof by evaporation under reduced pressure. The precipitate recovered by centrifugation or filtration is suspended in distilled water, inactive insolubles are discarded, and to the clear solution 1.5–5.0 volumes of cold acetone are added. The precipitate formed is collected by centrifugation, washed with acetone and dried under reduced pressure, to yield a crude concentrate in the form of a brown sticky powder containing the inhibitor of this invention.

Another alternative is to desalt the horse urine by gel filtration cross-linked dextran gels or polyacrylamide gels. To the desalted urine or the concentrate obtained therefrom by evaporation under reduced pressure, 1.5–5.0 volumes, preferably 2–3 volumes, of cold acetone is added. The precipitate obtained is washed with acetone and ether and dried under reduced pressure to yield a crude concentrate of the protease inhibitor of this invention.

Purification

For purification of the inhibitor of this invention the crude concentrate obtained by bentonite treatment or by the other procedures described above is dissolved in distilled water or dilute phosphate buffers of pH 5.0–7.5, preferably pH 5.5–6.0, to obtain solutions containing 2–50 mg per ml., preferably 10–20 mg per ml, of the crude concentrate. The solution is treated with 0.2 to 3.0 parts by volume of a slurry of diethylaminoethyl cellulose (DEAE-cellulose) containing 10–200 mg, preferably 50–100 mg, DEAE-cellulose which has been previously equilibrated with phosphate buffers 0.005–0.1 M and pH 5 to 7, preferably 0.02 to 0.05M, pH 5.5 to 6.0. The suspension is stirred for 15–120 minutes, preferably for 30–60 minutes, and filtered or centrifuged. The DEAE-cellulose residue is successively washed with 1–10 parts, preferably 2–3 parts of 0.02–0.05 M phosphate buffer pH 5–7, and 0.05 to 0.3 M, preferably 0.1–0.2 M of sodium chloride solution. The adsorbate is eluted by mixing the DEAE-cellulose with 1–10 volumes, preferably 2–3 volumes, of phosphate buffers 0.2 to 1.0M at pH 4.0 to 4.5, or with NaCl or KCl — HCl buffers at pH 1.5 to 2.5, or other suitable buffers of high ionic concentration and pH 1.5 to 4.5. The preferred agent for elution is 0.1–0.3 M NaCl or KCl containing 0.01 to 0.1 HCl and pH 1.7 to 2.5. The mixture is filtered, and the filtrate is collected. The DEAE-cellulose pad is eluted once more with 1–3 volumes of the same buffer. The combined eluates are dialyzed against distilled water or desalted by gel filtration. The inhibitor is precipitated by addition of 30–75 g, preferably 50 to 60 g, ammonium sulphate per 100 ml of the dialyzed or gel filtered solutions. The inhibitor may also be precipitated by addition of 2 volumes of acetone. The precipitate obtained is dissolved in water. The partially purified protease inhibitor at this state is a preparation of about 5 to 20% purity.

Further purification of the inhibitor is achieved by chromatography on DEAE-cellulose, carboxymethyl cellulose or Sephadex ion exchangers such as DEAE-Sephadex of CM-Sephadex (Pharmacia (Canada) Ltd., Montreal). The preferred agent for chromatography at this stage is Whatman DE-52, a microgranular pre-swolen form of DEAE-cellulose (Reeve-Angel, Clifton, N.J.). Whatman DE-52 columns are prepared by known procedues recommended by the manufacturers. The solution containing about 0.2 to 1.5 g of the partially purified inhibitor is applied to a 1–5 cm × 30–80 cm column of DE-52 previously equilibrated with a suitable buffer of low ionic concentration and pH 5–7, preferably phosphate buffer 0.02–0.1 M, pH 5–6. The column is washed with the same buffer. This is followed by washing with 0.05 to 0,1 M phosphate pH 4.0 to 5.0. Material of low inhibitor activity is removed by these washes. The adsorbate is eluted by buffers of higher ionic concentration (0.1–1.0 M) and pH 2 to 5.0. The preferred procedure is to use a gradient of decreasing pH such as pH 6 to 4 and increasing molarity (0.1 to 1.0 M) phosphate buffers. The fractions containing protease inhibitor are pooled, dialyzed against distilled water or dilute phosphate or acetate buffers pH 5–7 and lyophilized to yield an almost pure preparation of the protease inhibitor of this invention.

Further purification is achieved by rechromatography of the above material on DEAE-cellulose (DE-52) or by gel filtration on cross-linked dextran gels or polyacrylamide gels at PH 4 to 7.5 using phosphate, acetate or other suitable buffers.

Alternatively, the almost pure inhibitor is adsorbed on calcium phosphate gel, preferably a form of calcium phosphate gel known as Hydroxylapatite (Bio-Rad Co., Richmond, Calif.) at a low phosphate concentration (0.001 to 0.05 M) and pH 5 to 7. The adsorbate is eluted with phosphate buffer of the same pH but of higher concentration, for example 0.1 to 1.0 M. The preferred procedure for elution is to use a gradient of increasing phosphate concentration.

Homogeneity of the protease inhibitor of this invention is shown by ultracentrifugation, where a single boundary is obtained at pH 6.0.

Homogeneity is also established by electrophoresis, where the protease inhibitor moves as a single band; by gel filtration of various dextran gels, where a single symmetrical peak of the protease inhibitor is obtained; or by isoelectric focussing according to the method described by Vesterberg et al., Acta. Chem Scand. 20, 820, (1966), and by Hoagland, Science Tools Vol. 14, No. 2, 17 (1967), where the protease inhibitor is obtained in a single zone at its isoelectric pH of 4.5–4.6.

In summary, then, the protease inhibitor of this invention is advantageously prepared from clarified horse urine by the steps of a. adjusting the pH of the clarified horse urine to within the range pH 4.5 to 6.0;
b. admixing the urine with 0.05 to 5.0 parts by weight of an absorbent selected from the class consisting of aluminum silicate clay, magnesium oxide, diatomaceous earth and kaolin;
c. separating the absorbent from the admixture;
d. eluting the inhibitor from the absorbent with from 2 to 20 parts by volume of an aqueous eluent selected from the class consisting of aqueous pyridine, aqueous dimethyl sulfoxide and dilute ammonia;
e. adjusting the pH of the eluate to within the range pH 1.0 to 3.0;
f. repeating process steps b, c and d;
g. dialyzing the eluate against water;
h. precipitating the inhibitor from the dialyzed eluate by addition of acetone, ethanol, or ammonium sulfate and separating the precipitate;
i. dissolving the precipitate in water or phosphate buffer to pH 5.0–7.5;
j. admixing the dissolved precipitate with a cellulose anionic exchanger previously equlibrated to a pH of 5–7;
k. separating the exchanger from the admixture;
l. eluting the inhibitor from the exchanger; and
m. precipitating the inhibitor from the eluate by addition of acetone, ethanol or ammonium sulfate and separating the precipitated inhibitor.

EXAMPLE 1

Horse urine (260 liters) is clarified by centrifugation in a Sharples centrifuge. The clear centrifugate is adjusted to pH 5.5 with 4N acetic acid and 1000 g. of bentonite is added with stirring. The mixture is stirred for 1 hour and centrifuged in a Sharples centrifuge. The bentonite residue is stirred for 1 hour with 15 liters of 2% aqueous pyridine (v/v), and the mixture is centrifuged.

The clear supernatant obtained above is adjusted to pH 1.3 by addition of 4N $H_2SO_4$ and 85 g. of bentonite is added with stirring. The mixture is centrifuged after 1 hour. The bentonite residue is stired for one hour with about 2 liters of 4% aqueous pyridine (v/v), and the mixture is centrifuged. The centrifugate is dialyzed for 20 hours against running tap water at 5° to 15°C.

The dialyzed solution is cooled to 2° to 5°C. and 2 volumes of acetone at −15°C. is added with stirring. The precipitate obtained is successively washed with acetone and ether and dried under reduced pressure to yield 9.6 g. of brown powder hereafter referred to as the crude concentrate of the protease inhibitor of this invention.

EXAMPLE 2

One liter of clarified horse urine is dialyzed against running tap water at 5° to 15°C. for 20 hours. The dialyzed urine is cooled to about 5°C. and 2 volumes of acetone at −10°C. is added. The precipitate obtained thereby is washed with acetone and ether and dried under reduced pressure to give a crude preparation of the inhibitor.

EXAMPLE 3

Two liters of clarified horse urine is dialyzed against tap water for 20 hours at 5° to 15°C. and concentrated to 400 ml. by evaporation under reduced pressure at 30° to 35°C. To the concentrate 240 g. of $(NH_4)_2SO_4$ is added. The precipitate is suspended to 100 ml. of distilled water and centrifuged. The inactive residue is discarded and to the centrifugate 200 ml. of acetone at −10° to −15°C. is added. The precipitate obtained thereby is washed with acetone and ether and dried under reduced pressure to yield a crude preparation of the protease inhibitor of this invention in the form of a brown sticky material.

EXAMPLE 4

Two liters of horse urine is desalted by gel filtration through a 3000 ml. column of a dextran gel (Sephadex G-25) in three batches. The desalted urine is then concentrated to 200 ml. by evaporation under reduced pressure at 35°–40°C. To the concentrate 2 volumes of acetone at −10°C. is added and the precipitate formed is collected by centrifugation, washed with acetone and ether and dried under reduced pressure. A crude preparation of the protease inhibitor of this invention is obtained in the form of a brown sticky material.

EXAMPLE 5

DE-52 Batch Treatment

Four grams of crude concentrate obtained as described in Example 1 are dissolved in 400 ml. of distilled water and the solution is clarified by centrifugation. To the supernatent 240 ml. of a slurry of DE-52, previously equilibrated with 0.05 M. phosphate buffer at pH 6.0 and containing 60 mg. of DE-52 per ml., is added. After mixing for 30 minutes the mixture is centrifuged. The DE-52 residue is washed by mixing with 800 ml. of 0.05 M phosphate buffer pH 5.0 and the mixture is filtered on a Buchner funnel. The DE-52 cake is then washed with 800 ml. of 0.1 N NaCl. These washes remove some inactive materials without removing a significant amount of the inhibitor.

For elution of the protease inhibitor the DE-52 cake is stirred with 600 ml. of a solution of 0.02 N HCl - 0.2 M NaCl, pH 1.8, for 1 hour and the mixture is filtered. The cake is eluted once again with 300 ml. of the same buffer. The combined eluates are concentrated to about 400 ml. by lyophilization and 240 g. of ammonium sulfate is added. The precipitate obtained contains about 60-70% of the inhibitor activity present in the crude concentrate, and the activity of the protease inhibitor thus obtained is approximately ten times higher than that of the starting material.

EXAMPLE 6

DE-52 Chromatography

The precipitate containing the inhibitor obtained as described in Example 5 is dissolved in 20 ml. of distilled water and equilibrated with 0.05 M phosphate buffer at pH 6.0 either by dialysis or gel filtration through a column of Sephadex G-25. The sample is then applied to a column of DE-52 (2.5 × 30 cm.) equilibrated with 0.05 M phosphate buffer at pH 6.0. The column is successively washed with 300 ml each of 0.05 M phosphate buffer at pH 6.0; 0.05 M phosphate buffer at pH 5.0, and 0.05 M phosphate buffer at pH 4.2. The column is then eluted by forming a concentration gradient between 300 ml of 1.0 M and 300 ml of 0.05 M phosphate buffers at pH 4.2. Franctions of 3 ml. each are collected. The fraction containing the first peak of a material absorbing at 280 nm contains the main portion of the protease inhibitor. The active fractions are pooled, dialyzed against water and lyophilized to yield an almost pure preparation of the protease inhibitor of this invention. One milligram of this preparation inhibits about 2 mg. of trypsin.

EXAMPLE 7

If further purification of the protease inhibitor obtained as described in Example 6 is desired this can be achieved by gel filtration through a column of Sephadex G-75. About 100–200 mg of the preparation obtained as described in Example 6 is applied to a 2.5 × 80 cm column of Sephadex G-75 equilibrated with 0.05 M ammonium acetate buffer at pH 6.0. Fractions containing material absorbing at 280 nm and assaying for most of the inhibitor activity are pooled, dialyzed against water or 0.01 M ammonium acetate buffer and lyophilized. An electrophoretically homogenous preparation of the protease inhibitor of this invention is thereby obtained.

EXAMPLE 8

Further purification of the protease inhibitor obtained as described in Example 6 is also achieved by chromatography on Hydroxylapatite. The sample is applied to a 2 × 30 cm column of Hydroxylapatite previously equilibrated with 0.005 M phosphate buffer at pH 6.0. The column is washed with 200 ml. of the same buffer. The absorbate is eluted by gradually increasing the concentration of the phosphate in the developing solution to 0.5 molar. Fractions corresponding to the main peak of absorption of 280 nm are pooled and concentrated by lyophilization. The concentrated solution is desalted by dialysis against distilled water or 0.01 M ammonium acetate buffer at pH 6.0 and lyophilized to yield a pure preparation of the protease inhibitor of this invention.

The purity of the material obtained as described in Examples 7 or 8 is checked by various well known methods such as polyacrylamide gel electrophoresis, ultracentrifugation, and isoelectric focussing.

Homogeneity of the purified protease inhibitor from horse urine is also examined by sedimentation analysis. In the ultracentrifuge the inhibitor shows a single symmetrical boundary at pH 6.0 (phosphate-sodium chloride buffer, ionic concentration 0.12, protein concentration 0.4%). The sedimentation coefficient is $s_{20,w} = 1.94$, and the average molecular weight is calculated as 20,400.

EXAMPLE 9

The preparation of the inhibitor obtained in Example 6 may be further purified by the isoelectric focussing procedure as described by Vesterberg et al., Acta. Chem. Scand. 20, 820, (1966), and by Hoagland, Science Tools Vol. 14, No. 2, 17 (1967). By this technique proteins are separated according to their isoelectric points in the presence of low molecular weight carrier ampholytes such as mixtures of synthetic aminocarboxylic acids. To obtain a convection free medium a density gradient of a nonionic compound such as sucrose in which carrier ampholytes have been dissolved, is established in a specially designed column. The sample is either layered at some chosen level in the column or evenly distributed throughout the column. The pH gradient is formed by the carrier ampholytes when a voltage (200-1200 volts DC) is applied. The proteins in this sample will eventually migrate to the point where they are electrically neutral i.e. pH is equal to the isoelectric point of that species.

Using this procedure 25 mg of the protease inhibitor obtained in Example 6 is subjected to the isoelectric focusing procedure. Material absorbing at 280 nm and exhibiting high inhibitor activity is collected as a sharp band at pH 4.5 to 4.6. This material is dialysed against water to remove small molecular weight materials and lyophilized to yield 10 mg of a pure preparation of the protease inhibitor.

EXAMPLE 10

Assay of Protease Inhibitor

The assay is carried out by a modification of the procedure described by Fritz et al., Z. Physiol Chem., 345, 150 (1966) and Ann. N.Y. Acad. Sci. 146, Art. 2,400 (1968), as follows.

Reagents

Trypsin: (2 times crystallized obtained from Mann Research Laboratories New York, N.Y.). A stock solution containing 1 mg/ml in 0.001M HCl is prepared and stored at 0° to 5°C. Before use the stock solution is diluted in 0.001M HCl to contain 200µg/ml.

Substrate: Benzoyl-DL-arginine-p-anilide (100 is dissolved in 100 ml water.

Buffer: Triethanolamine HCl, 0.1M solution in water, adjusted to pH 7.8 with 1N NaOH.

Temperature of assay: 25°C.

Method

Triethanolamine buffer (1.8 ml), hydrochloric acid (0.001 M, 0.1 ml), water (0.1 ml), and substrate solution (1.0 ml) are mixed in a spectrophotometric cuvette (1 cm light path) and the spectrophotometer is set at zero at 405 nm. A second cuvette is filled with trypsin solution (0.1 ml, 20 µg), triethanolamine buffer (1.8 ml), and water (0.1 ml), and 1.0 ml of the substrate solution is added at the start of the experiment. The change in extinction per minute (ΔE) due to the formation of p-nitroaniline from the substrate is recorded for 3 minutes. Under the above conditions 20 µg of trypsin will cause an increase in extinction at 405 nm of 0.20 per 3 minutes per 3 ml total volume.

The same experiment is repeated in another cuvette, except that the water (0.1 ml) is replaced by an aqueous solution of the protease inhibitor of this invention (2-5 µg in 0.1 ml of water). The mixture is incubated for 3-5 minutes at 25°c, the substrate (1.0 ml) is added, and the rate of change of extinction at 405 nm is measured over a period of 3 minutes as above. The decrease in rate of change of extinction is a measure of the activity of the protease inhibitor and is proportional to its concentration. Under the conditions of this assay, a decrease in ΔE of 0.01 per 3 minutes per 3 ml corresponds to the inhibition of 1 µg of trypsin. One milligram of the purest preparations of the protease inhibitor of this invention inhibits about 3-4 mg of trypsin when assayed by the above method.

One milligram of the purest preparation of the protease inhibitor of this invention exhibits an activity of 3000-4000 international milliunits (ImU) as defined by Trautschold in Natural Proteinase Inhibitors, R. Vogel, I. Trautschold, and E. Werle, Academic Press, New York and London, 1968, pp. 7-8.

I claim:

1. A protease inhibitor isolated from clarified horse urine by the process sequence consisting essentially of
    a. adjusting the pH of the clarified horse urine to within the range pH 4.5 to 6.0;
    b. admixing the urine with 0.05 to 5.0 parts by weight of an absorbent selected from the class consisting of aluminum silicate clay, magnesium oxide, diatomaceous earth and kaolin;
    c. separating the absorbent from the admixture;
    d. eluting the inhibitor from the absorbent with from 2 to 20 parts by volume of an aqueous eluent selected from the class consisting of aqueous pyridine, aqueous dimethyl sulfoxide and dilute ammonia;
    e. adjusting the pH of the eluate to within the range pH 1.0 to 3.0;
    f. repeating process steps b, c and d;
    g. dialyzing the eluate against water;
    h. precipitating the inhibitor from the dialyzed eluate by addition of acetone, ethanol, or ammonium sulfate and separating the precipitate;
    i. dissolving the precipitate in water or phosphate buffer of pH 5.0-7.5;
    j. admixing the dissolved precipitate with a celluloge anionic exchanger previously equlibrated to a pH of 5-7;
    k. separating the exchanger from the admixture;
    l. eluting the inhibitor from the exchanger; and
    m. precipitating the inhibitor from the eluate by addition of acetone, ethanol or ammonium sulfate and separating the precipitate inhibitor;

which protease inhibitor
    a. has a molecular weight of 26,000-28,000 when determined by gel filtration; of approximately 17.000 when determined by polyacrylamide gel electrophoresis; and of about 20,400 when determined by ultracentrifugation;
    b. has a maximum of u.v. light absorption at about 280 nm;
    c. has an amino acid composition as determined by hydrolysis with 6N hydrochloric acid shown in the following table;

| Duration of Hydrolysis | Amino Acids, grams per 100 g. Protease Inhibitor | | |
|---|---|---|---|
| | 24 Hours | 48 Hours | 72 Hours |
| Lysine | 7.4 | 7.2 | 7.1 |
| Histidine | 1.0 | 1.0 | 0.9 |
| Arginine | 6.5 | 6.5 | 6.2 |
| Cysteic Acid | — | — | — |
| Aspartic Acid | 11.7 | 12.0 | 12.0 |
| Methionine Sulfone | — | — | — |
| Threonine | 4.2 | 4.3 | 4.4 |
| Serine | 4.2 | 4.3 | 4.4 |
| Glutamic Acid | 17.0 | 17.3 | 17.5 |
| Proline | 3.3 | 3.3 | 3.4 |
| Glycine | 7.8 | 8.0 | 8.0 |
| Alanine | 5.4 | 5.6 | 5.7 |
| ½ Cystine | — | — | — |
| Valine | 2.5 | 2.5 | 2.6 |
| Methionine | 1.6 | — | — |
| Isoleucine | 4.0 | 4.1 | 4.2 |
| Leucine | 7.5 | 7.6 | 7.8 |
| Tyrosine | 7.8 | 7.9 | 7.1 |
| Phenylalanine | 8.1 | 8.4 | 8.6 |
| Total gms. | 100 | 100 | 100 | d. has an isoelectric point of 4.5-4.6;
e. is electrophoretically homegeneous;
f. stains with Ponceau S;
g. and one milligram of which inhibits about 3-4 milligrams of trypsin.

* * * * *